March 10, 1931. R. WINTERS 1,795,749
LOADED CHECK VALVE
Filed April 29, 1929
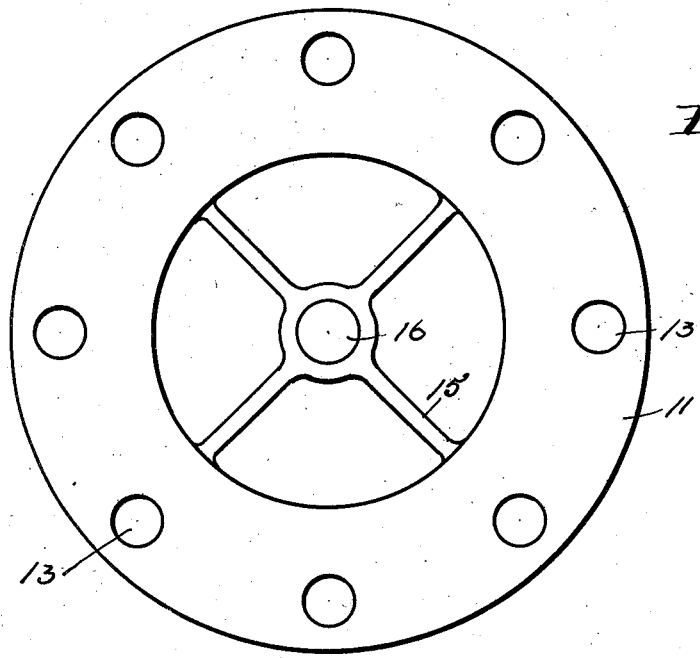
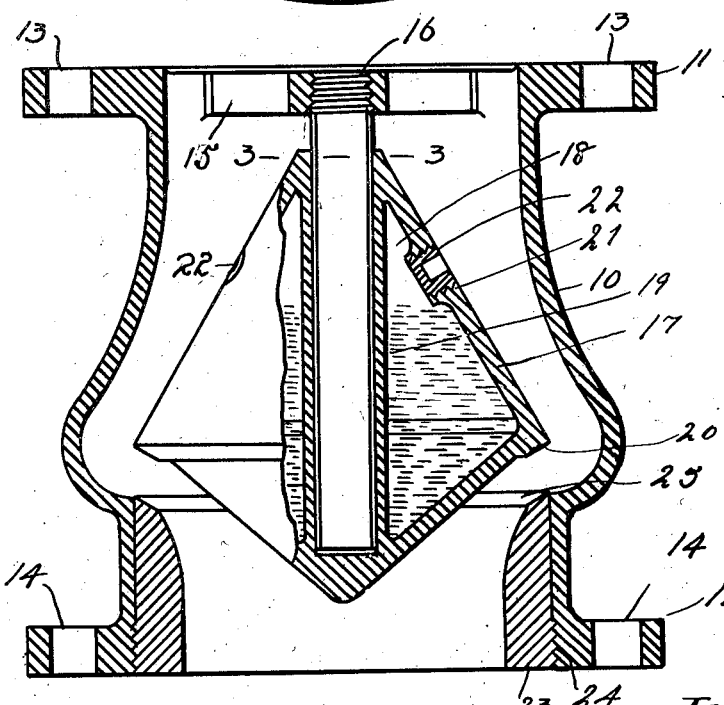
Inventor
Roger Winters
By W. W. Williamson Atty.

Patented Mar. 10, 1931

1,795,749

UNITED STATES PATENT OFFICE

ROGER WINTERS, OF PHILADELPHIA, PENNSYLVANIA, ASSIGNOR OF TWENTY-THREE AND ONE-THIRD PER CENT TO ELIZABETH C. DUNLAP, AND OF TWENTY PER CENT TO JOHN F. DUNLAP, JR., BOTH OF PHILADELPHIA, PENNSYLVANIA

LOADED CHECK VALVE

Application filed April 29, 1929. Serial No. 358,909.

My invention relates to new and useful improvements in loaded check valves, and has for its object to provide an exceedingly simple and efficient valve of this description which will provide for the seating of the valve member in advance of the back flow of the water in the line above the valve without the use of springs.

A further object of the invention is to provide a valve member capable of being loaded to the proper degree for service in connection with varying water pressures.

With these and other ends in view, this invention consists in the details of construction and combination of elements hereinafter set forth and then specifically designated by the claims.

In order that those skilled in the art to which this invention appertains may understand how to make and use the same, I will describe its construction in detail referring to the different parts by numerals:

Fig. 1 is a plan view of the valve casing.

Fig. 2 is a central vertical section of Fig. 1, the valve member being partly broken away and sectioned to more clearly illustrate its construction.

Fig. 3 is a section at the line 3—3 of Fig. 2.

In carrying out the invention as herein embodied, 10 represents the valve casing having the flanges 11 and 12 through which are formed the holes 13 and 14 respectively for connecting the valve in a pipe line.

15 represents a spider cast with the upper portion of the casing in the center of which is threaded the upper end of the guide rod 16 for guiding the valve member 17 which latter is cast with a space 18 in the interior thereof and having a guide tube 19 extending through the center of this space.

When the valve member is in place within the casing, the rod 16 extends into the guide tube as clearly shown in Fig. 2 so as to accurately guide the valve member in its up- and-down movements. This rod also serves to limit the upper movement of the valve member by the lower end thereof contacting with the bottom of the guide tube as will be readily understood.

The valve member has formed thereon a seating surface 20 and that portion extending downward from this seating surface is conical in shape while that portion extending upward from the seating surface is in the form of a truncated cone and threaded holes 21 are formed through the walls of this truncated cone for the reception of the threaded plugs 22 for sealing said holes.

23 represents a bushing which is threaded into the lower portion of the casing as indicated at 24 and the upper end of this bushing has formed thereon the valve seat 25 against which the seating surface of the valve member is adapted to close.

By the use of this bushing, the valve member may be of much larger diameter at that portion upon which the bearing surface is formed than could otherwise be the case and leaves sufficient clearance for the passage of the proper amount of water when the valve member has but a relatively short lift and by swelling the casing surrounding the greater circumference of the valve member gives free passage for the water capacity of the line.

In practice, the valve member is loaded by pouring a low melting metal such as lead through the openings 21 until the proper weight is added to this member after which the holes are sealed with the plugs 22 or in case of the need of greater weight than lead would give, mercury may be introduced into the interior of the valve member to a height which will leave sufficient air space above the mercury level to provide for the expansion of the mercury.

A valve member of this construction when forced to its upper limit by the action of a pump driving water through the line, will rapidly sink during the period of slack water and close upon the valve seat before the back lash or reverse flow of the water in the line takes place and this is facilitated by the conical shape of the lower portion of the valve member and also by the shape of the upper portion of this member, preventing any suction which would otherwise retard its downward movement.

The rapid closing of the valve without spring action during slack water eliminates the hammering which takes place in check valves when controlling relative high pressures and by actual experiment, I have found that this form of valve is noiseless as well as being much more efficient than the ordinary form of valve and eliminates the wear on the seating surface and valve seat instant to spring closing valves as well as relieving the line of the strains instant to the hydraulic hammering.

I prefer that the guide rod 16 be square or approximately square in cross section so that when fitted into the round bore of the guide tube 19, there will be no tendency to trap air or water within said tube and will offer but little resistance to the sliding of the valve member upon said rod.

Of course I do not wish to be limited to the exact details of construction as herein shown, as these may be varied within the limits of the appended claims without departing from the spirit of my invention.

Having thus fully described my invention, what I claim as new and useful is:—

1. In a valve of the noiseless type as described, a loaded quick seating check valve streamlined in the direction of the flow and seating before substantial reverse of the flow of the fluid, and means for guiding said valve.

2. In a valve the combination of a non-buoyant quick seating streamlined check valve, within a casing of reverse curve walls forming an annular venturi, and means for guiding said valve, said valve seating before a substantial reverse flow of the fluid.

3. In a valve the combination of a hollow non-buoyant check valve of streamline form within a casing, and means to guide said check valve to its seat, said check valve automatically seating before substantial reverse flow of the fluid.

4. In a valve, the combination of a stream line check valve within a casing, with a guide attached thereto and projecting into said hollow valve, guiding said check valve to its seat, said check valve seating before substantial reverse of the fluid flow.

In testimony whereof, I have hereunto affixed my signature.

ROGER WINTERS.